United States Patent
Ito et al.

(10) Patent No.: US 10,038,176 B2
(45) Date of Patent: Jul. 31, 2018

(54) ELECTRIC WORK VEHICLE

(71) Applicant: Kubota Corporation, Osaka-shi (JP)

(72) Inventors: Hirokazu Ito, Sakai (JP); Yasuhiro Manji, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 15/356,771

(22) Filed: Nov. 21, 2016

(65) Prior Publication Data

US 2017/0263914 A1 Sep. 14, 2017

(30) Foreign Application Priority Data

Mar. 11, 2016 (JP) ................................. 2016-048159

(51) Int. Cl.
| | |
|---|---|
| *B60K 1/02* | (2006.01) |
| *H01M 2/34* | (2006.01) |
| *B60K 1/04* | (2006.01) |
| *B60L 11/18* | (2006.01) |
| *H01M 2/10* | (2006.01) |
| *H01M 2/20* | (2006.01) |
| *H01M 10/42* | (2006.01) |

(52) U.S. Cl.
CPC ................. *H01M 2/34* (2013.01); *B60K 1/02* (2013.01); *B60K 1/04* (2013.01); *B60L 11/1861* (2013.01); *B60L 11/1877* (2013.01); *H01M 2/1077* (2013.01); *H01M 2/1083* (2013.01); *H01M 2/206* (2013.01); *H01M 10/425* (2013.01); *B60K 2001/0494* (2013.01); *B60L 2200/40* (2013.01); *B60L 2250/00* (2013.01); *B60Y 2200/223* (2013.01); *B60Y 2400/112* (2013.01); *H01M 2010/4271* (2013.01); *H01M 2220/20* (2013.01); *Y10S 903/907* (2013.01)

(58) Field of Classification Search
None
See application file for complete search history.

(56) References Cited

U.S. PATENT DOCUMENTS

| | | | | |
|---|---|---|---|---|
| 6,072,250 A | * | 6/2000 | Thandiwe | H02J 9/005 307/150 |
| 2012/0186887 A1 | * | 7/2012 | Moriguchi | A01D 69/02 180/65.1 |

FOREIGN PATENT DOCUMENTS

JP       2011177106 A    9/2011

* cited by examiner

*Primary Examiner* — John D Walter
*Assistant Examiner* — Hilary L Johns
(74) *Attorney, Agent, or Firm* — The Webb Law Firm

(57) ABSTRACT

An electric work vehicle includes a plurality of battery mounting portions, a plurality of battery packs that can be detachably mounted to the battery mounting portions, a main body contact provided for each one of the battery mounting portions and electrically connected with the battery back mounted to the battery mounting portion, a power feeding circuit to which the main body contact is parallel connected, a battery switch configured to block flow of electric power from the battery pack to the power feeding circuit, a switch operating portion for operating the battery switch, a charged amount estimating portion for estimating a charged power of the battery pack mounted to the battery mounting portion, an electric motor driven by power fed from at least one battery pack via the power feeding circuit, and a driving wheel receiving power transmitted from the electric motor.

6 Claims, 6 Drawing Sheets

ELECTRIC WORK VEHICLE

CROSS REFERENCE TO RELATED TO APPLICATION

This application claims priority to Japanese Patent Application No. 2016-048159 filed Mar. 11, 2016, the disclosure of which is hereby incorporated in its entirety by reference.

BACKGROUND OF THE INVENTION

Field of the Invention

U.S. Pat. Application Publication No. 2012/0186887 and Japanese Patent Application Publication No. 2011-177106 respectively disclose a self-propelled riding electric grass mower machine having a traveling motor that drives driving wheels and a blade motor that drives a mowing blade and a plurality of batteries for supplying electric power to the respective motors. The plurality of batteries of this electric grass mower machine are mounted horizontally at a rear portion of a vehicle body and a protection frame that covers these batteries for their protection is fixed to the vehicle body. Further, the protection frame and the batteries are covered by a cowling. For a replacement operation of the batteries, the plurality of batteries are dismounted simultaneously and then a same number of new batteries are mounted.

With the above-described electric grass mower machine, provision of the plurality of batteries enable a work-involved traveling for a long period of time. However, when the charged capacity is reduced, it is necessary to replace the plurality of batteries altogether at one time, so there is a problem of a battery replacement operation and battery charging operation taking a long time. Further, with the above-described electric grass mower machine, since a plurality of batteries suited for long-time work-involved traveling are mounted, the charged amount (capacity) becomes excessive in the case of short-time work-involved traveling and also the weight of the batteries becomes a heavy load.

In view of the above-described state of the art, there is a need for an electric work vehicle that allows mounting of a battery (batteries) that can cope with various modes of work-involved traveling in an efficient manner.

SUMMARY OF THE INVENTION

An electric work vehicle according to the present invention comprises: a plurality of battery mounting portions;

a plurality of battery packs that can be detachably mounted to the battery mounting portions;

a main body contact provided for each one of the battery mounting portions and electrically connected with the battery back mounted to the battery mounting portion;

a power feeding circuit to which the main body contact is parallel connected;

a battery switch configured to block flow of electric power from the battery pack to the power feeding circuit;

a switch operating portion for operating the battery switch;

a charged amount estimating portion for estimating a charged power of the battery pack mounted to the battery mounting portion;

an electric motor driven by power fed from at least one battery pack via the power feeding circuit; and a driving wheel receiving power transmitted from the electric motor.

With the above-described configuration, since the battery pack mounted to the battery mounting portion is parallel connected to the power feeding circuit, it is possible to mount any desired number of battery packs to the battery mounting portions. Since the electric motor can be driven even when only one battery is mounted, in the case of short time work-involved traveling, the vehicle weight can be light advantageously. Further, even in case a plurality of battery packs are mounted, for each battery pack, electric connection thereof to the power feeding circuit can be switched ON/OFF by the battery switch. So, various uses of the battery packs are made possible. For instance, only one of the plurality of battery packs mounted can be used as an auxiliary battery pack with its battery switch being switched OFF, and a work-involved traveling can be carried out with the other battery packs. When the powers of the other battery packs have been used up, the auxiliary battery pack can be switched ON, thus allowing traveling up to a site where electric charging is possible. With this, a work-involved traveling can be effected fully and with security until running out (power exhaustion) of the other battery packs.

Further, in case e.g. the plurality of battery packs are mounted to the battery mounting portions, but not all the battery packs are used at the same time, rather the battery packs are used in order one after another, when the charged capacity of the used battery pack drops below a reference value, it is necessary to switch this pack over to the next battery pack. Then, in order to allow such replacement operation to proceed smoothly, according to one preferred embodiment of the present invention, the switch operating portion is configured to be capable of automatic operation for switching a battery pack having a charged capacity below the reference value to a battery pack having a charged capacity higher than the reference value.

If the switch operating portion were not provided with such automatic operational function described above or it is desired to select the order of a battery pack to be used next manually, when a driver recognizes a charged capacity of a particular battery pack dropping below the reference value, the driver is to operate a corresponding switch. In order to satisfy such need, according ton one preferred embodiment of the present invention, there is provided a reporting device for reporting a battery pack whose charged capacity is below the reference value, and the switch operating portion is configured to be manually operable.

According to one preferred embodiment of the present invention relating to a battery switch, the battery switch is incorporated in the power feeding circuit. This arrangement allows integration of battery switches for the battery packs to be mounted to the respective battery mounting portions. Further, the cost of battery pack is reduced as it does not incorporate a battery switch therein. Moreover, with this arrangement, there is no need to provide any connector/socket for control signal lines for battery switch operations between the battery mounting portion and the battery pack. Therefore, this arrangement is suitable for a case where a greater number of battery packs than battery mounting portions are to be fabricated.

According to a further preferred embodiment of the present invention relating to a battery switch, the battery switch is incorporated in the battery pack. With this arrangement, since the battery switch is incorporated in the battery pack, there is obtained an advantage of the battery switch being protected by a case of the battery pack from the external environment.

For a battery as a drive source for a vehicle, a large charge capacity is required, so that the battery tends to be large and heavy. According to the present invention, such charge capacity required for a vehicle can be allocated to a plurality of battery packs. So, each battery pack is relatively light, but handling thereof is not easy. In particular, when mounting or dismounting of battery packs to/from the battery mounting portions is to be carried out manually, this manual operation needs to be done with great care. Then, in order to facilitate such mounting and dismounting of battery packs, according to one preferred embodiment of the present invention, the battery mounting portion includes a slide mechanism to which the battery pack is to be slidably inserted directly from the outside of the vehicle body. With this arrangement, once a battery pack to be mounted to a battery mounting portion is placed at an entrance of the slide mechanism, the battery pack can be slidably inserted to the battery mounting portion by the slide mechanism automatically. Moreover, with this arrangement, the battery pack can be slidably inserted from the outside of the vehicle body directly, without need to remove the hood or cowling. Thus, the replacement operation of battery pack can be made less troublesome.

DETAILED DESCRIPTION OF THE PREFERRED EMBODIMENTS

Figure 1:
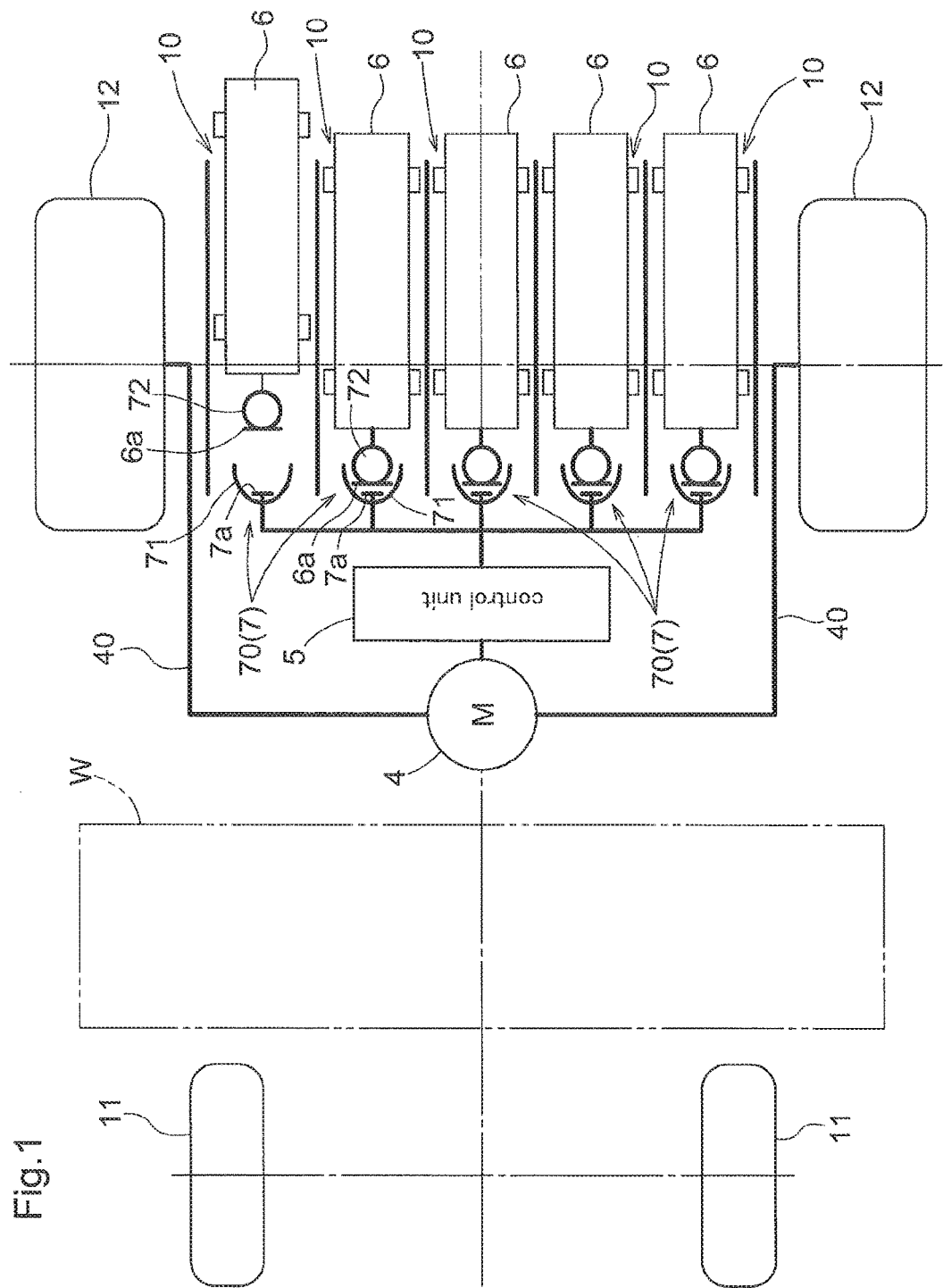
FIG. 1 is an explanatory view for explaining a basic configuration of a battery system to be mounted on an electric work vehicle.

Before specific embodiments of an electric work vehicle relating to the present invention are explained, a basic configuration of a battery system to be mounted on this electric work vehicle will be explained with reference to FIG. 1 and FIG. 2. The battery system of this electric work vehicle employs a portable battery pack 6 which is formed compact and light-weighted. This electric work vehicle includes a plurality (five in FIG. 1) of battery mounting portions 7 for the battery packs 6. The plurality of battery packs 6 have a total weight that can affect the vehicle body balance. Therefore, in the case of this electric work vehicle mounting a utility implement W between front wheels 11 and rear wheels 12, the battery mounting portions 7 are disposed adjacent axles of the rear wheels 12. In the case of an electric work vehicle mounting such implement W rearwardly of the rear wheels 12, the battery mounting portions 7 will be disposed adjacent axles of the front wheels 11 or forwardly of the front wheels 11, or between the front wheels 11 and the rear wheels 12. However, in connection with e.g. vehicle body balance or disposing space, the battery mounting portions 7 can be disposed in distribution over the entire area of the vehicle body of this electric work vehicle.

The battery pack 6 is portable and can be detachably attached to the battery mounting portion 7. The battery mounting portion 7 includes a main body contact 7a to be electrically connected to a battery contact 6a of the battery pack 6. The main body contact 7a is connected parallel to a power feeding circuit 8 for feeding electric power from the battery pack 6 to a control unit 5. The control unit 5 includes a motor controlling portion 51 for driving the electric motor 4 with using the power fed from the battery pack 6. Since the battery pack 6 mounted to each battery mounting portion 7 is connected parallel to the power feeding circuit 8, as long as at least one or more battery pack(s) 6 is (are) mounted, driving of the electric motor 4 is possible. Power from the electric motor 4 is transmitted via a transmission 40 to the rear wheels 12 which are driving wheels.

Figure 2:
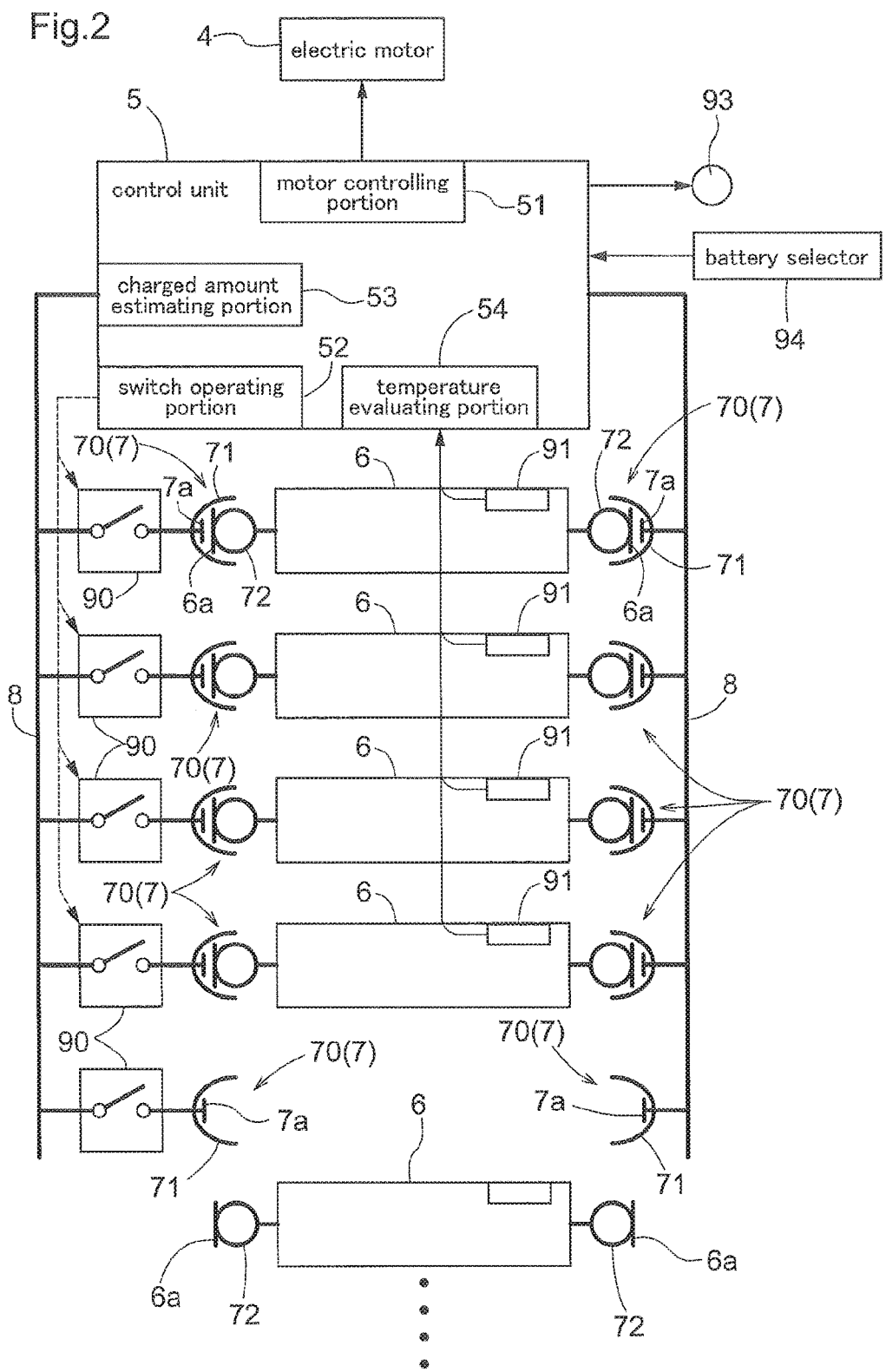
FIG. 2 is a simplified circuit diagram of the battery system.

In the example shown in FIG. 1 and FIG. 2, a battery switch 90 for disconnecting the connection between the battery pack 6 and the control unit 5 in order to stop the power feeding function of the battery pack 6 mounted to the battery mounting portion 7 is included in the power feeding circuit 8. In order to switch ON/OFF this battery switch 90, the control unit 5 includes a switch operating portion 52. By a switch switching signal from this switch operating portion 52, it is also possible to initiate or stop the power feeding function of a desired battery pack 6 among the battery packs 6 mounted to the battery mounting portions 7. Incidentally, the battery switch 90 can be incorporated in the battery pack 6.

In the example shown in FIG. 2, the control unit 5 includes a charged amount estimating portion 53 and a temperature evaluating portion 54. The charged amount estimating portion 53 estimates a charged amount of the battery pack 6 mounted to the battery mounting portion 7. The temperature evaluating portion 54 evaluates a battery temperature of the battery pack 6 mounted to the battery mounting portion 7, based on a detection signal from a temperature sensor 91 included in this battery pack 6. Thus, based on an estimation result of charged amount by the charged amount estimating portion 53 and/or evaluation result of battery temperature by the temperature evaluating portion 54, the control unit 5 can control switching ON/OFF of the battery switch 90. For instance, upon detection of a battery pack 6 whose charged amount is lower than a reference value or a battery pack 6 whose battery temperature is higher than a reference value, the control unit 5 will give a control instruction to the switch operating portion 52 to switch OFF the battery switch 90 connected to this battery pack 6. Regarding charged amount, no improvement thereof will be possible without charging. Therefore, if an auxiliary battery pack 6 is mounted to a battery mounting portion 7, the control unit 5 will give a control instruction to the switch operating portion 52 so as to switch ON the battery switch 90. In response to this, switching from the battery pack 6 whose charged amount is below the reference value to a battery pack 6 having full charged amount is effected automatically. In case a battery pack 6 whose battery temperature is higher than the reference value is detected, the control unit 5 will keep the battery switch 90 OFF for a while, and then, when the battery temperature drops below the reference value, the control unit 5 switches the battery switch 90 ON, thus restricting deterioration of the battery pack 6. Incidentally, as for the control instruction to the switch operating portion 52, if it is arranged such that this instruction is outputted via a manually operable battery selector 94, manual switchover of the battery pack 6 will be made possible. In that case, in order to allow the driver to recognize the battery pack 6 whose charged amount is low or the battery pack 6 whose battery temperature is high, there is provided a reporting device 93 that reports the estimation result of the charged amount estimating portion 53 or the evaluation result of the temperature evaluating portion 54. The reporting device 93 for this estimation result can be in the form of reporting by an alarm lamp or can be a mode of reporting by a slide bar that allows continuous recognition of the charged amount or battery temperature.

Although shown only schematically in FIG. 1, the battery mounting portion 7 includes a slide mechanism 10 that allows sliding insertion of the battery pack 6 directly from the outside of the vehicle body. Namely, an insertion opening of the slide mechanism 10 can be exposed to the outside of the vehicle body, and upon insertion of a leading end of the battery pack 6 into this insertion opening, the slide mechanism 10 provides smooth mounting of the battery pack 6 to the battery mounting portion 7. The slide mechanism 10 per se has a well-known arrangement, and a guide rail arrangement, a guide roller arrangement, etc. can be employed.

Figure 3:
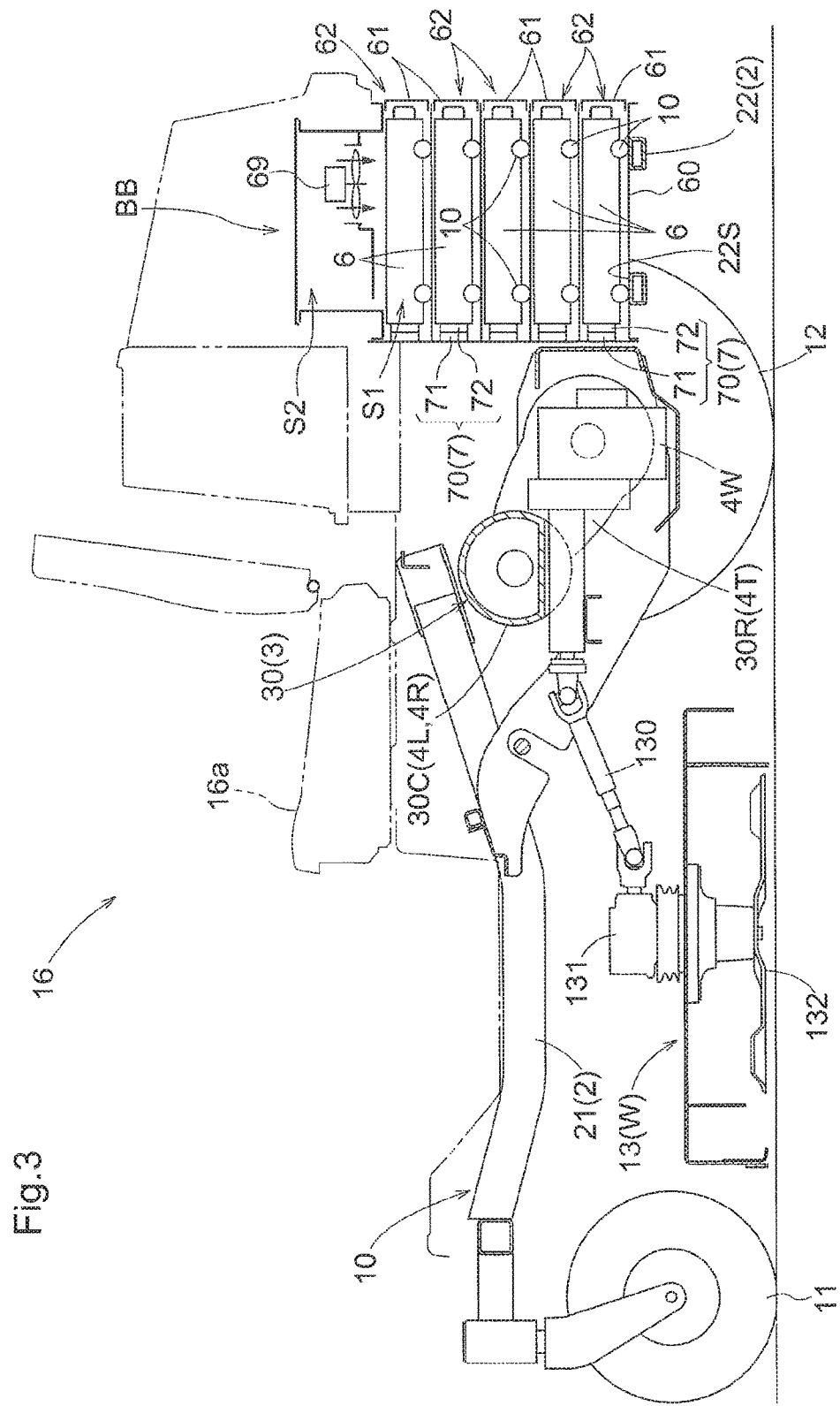
FIG. 3 is a basic configuration side view showing a basic configuration of a grass mower machine.
Figure 4:
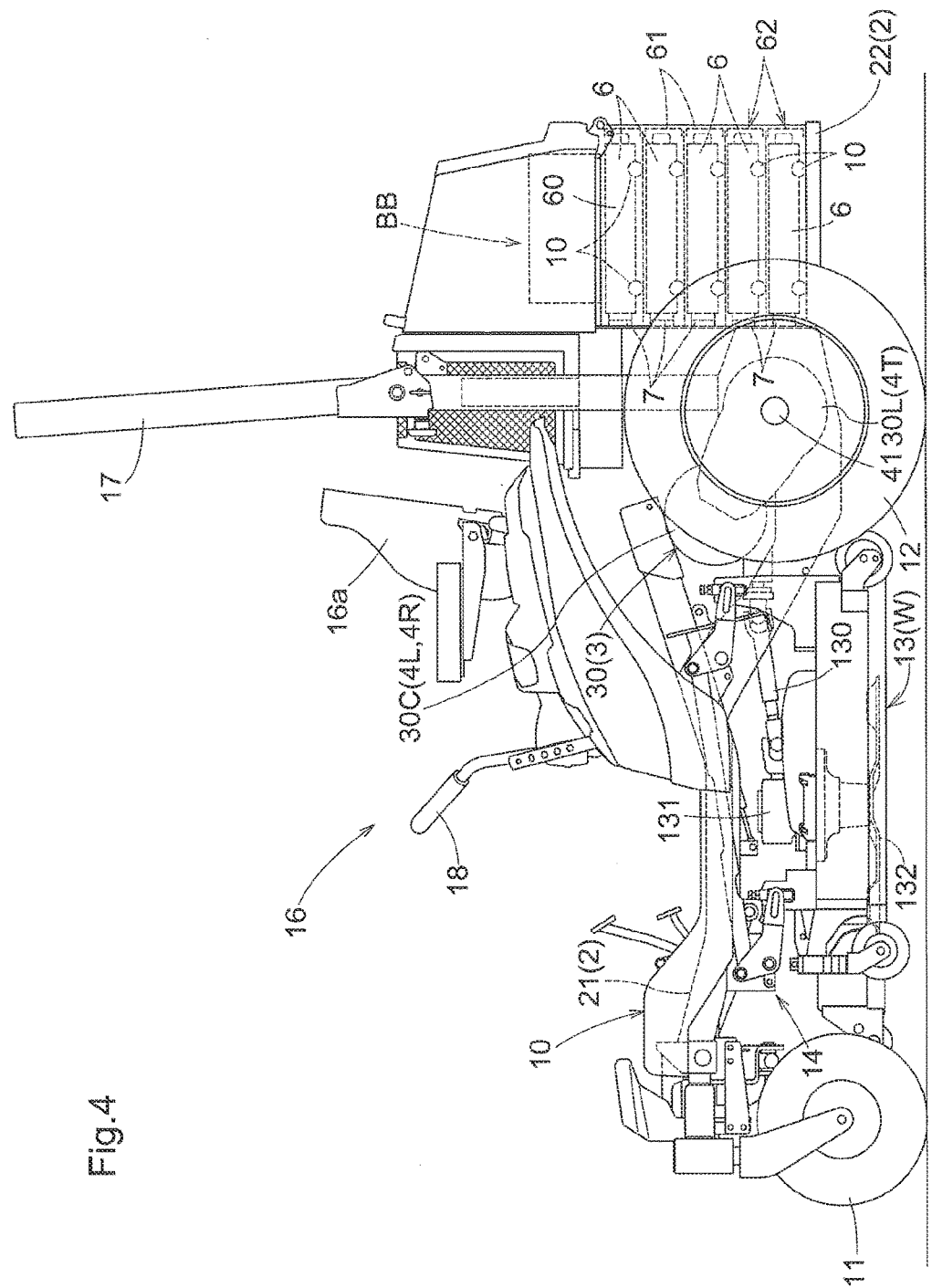
FIG. 4 is a side view of the grass mower machine.
Figure 5:
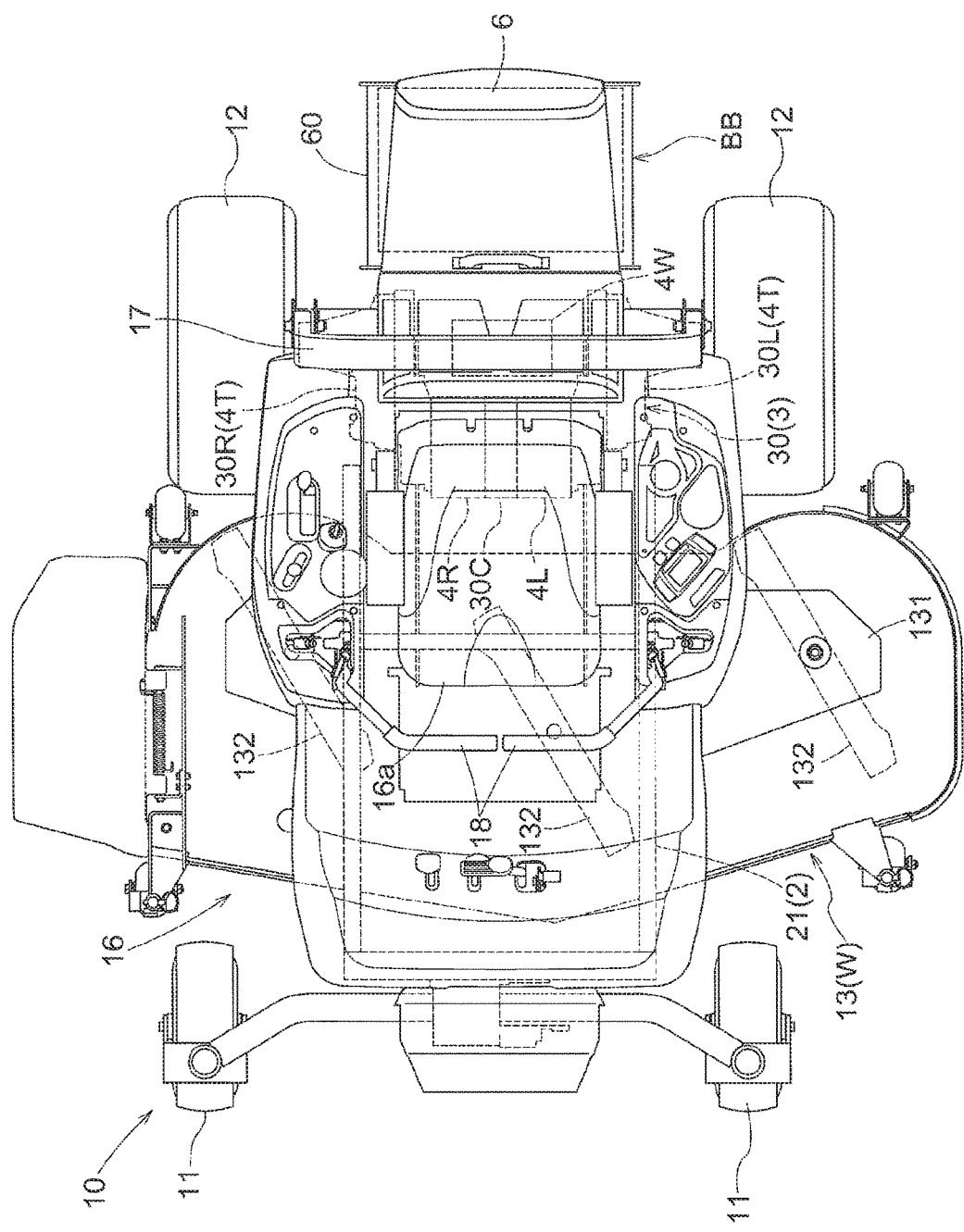
FIG. 5 is a plane view of the grass mower machine.
Figure 6:
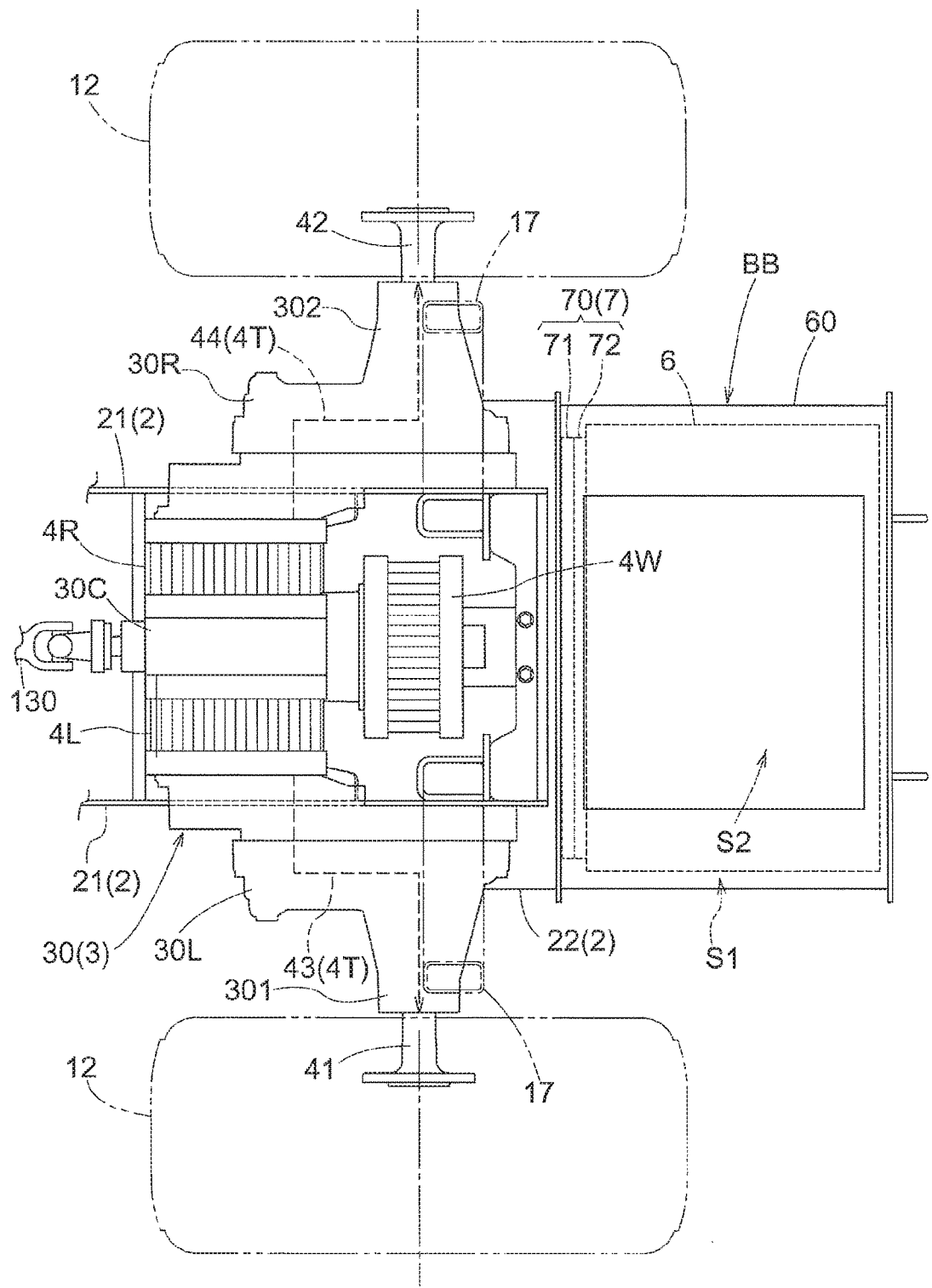
FIG. 6 is a schematic plane view showing a battery pack and an electric motor to which electric power is fed from the battery pack.

Next, a specific embodiment of an electric work vehicle using the battery system as described above with reference to FIG. 1 and FIG. 2 will now be explained. FIG. 3 is a basic configuration side view showing a basic configuration of an electric grass mower machine as one example of an "electric work vehicle". FIG. 4 is a side view of the electric grass mower machine. FIG. 5 is a plane view of the electric grass mower machine. FIG. 6 is a plane view showing the battery pack 6 and the electric motor 4 receiving power supply from the battery pack 6. The electric grass mower machine (to be referred to simply as the "grass mower machine", hereinafter) includes a vehicle body frame 2 constituting a vehicle body supported on the ground by the pair of left and right front wheels 11 and a pair of left and right rear wheels 12 that are rotatably driven. The vehicle body frame 2 consists of a pair of left and right front frames 21 and a rear frame 22. Between the front wheels 11 and the rear wheels 12, a mower unit 13 as the utility implement W is suspended from the front frames 21 via a link mechanism 14. The mower unit 13 includes a blade transmission mechanism 131 and blades 132 rotated by the blade transmission mechanism 131. A driving section 16 is disposed at a vehicle body front-rear direction center region of the vehicle body frame 2. At this driving section 16, a driver's seat 16a is disposed via a seat support body to the vehicle body frame 2.

As shown in FIG. 6, at a rear end region of the front frames 21, a driving unit 3 is disposed between the left and right front frames 21. This driving unit 3 includes a case structure 30. The case structure 30 exhibits a portal shape as seen in its plane view and is constituted of a left case portion 30L as its left portion, a right case portion 30R as its right portion and a center case portion 30C interconnecting the left case portion 30L and the right case portion 30R with each other. The left case portion 30L and the right case portion 30R respectively extends rearwards from the center case portion 30C. At an end region of the left case portion 30L, there is formed a rear axle bearing portion that supports the left rear wheel 41, and at an end region of the right case portion 30R, there is formed a rear axle bearing portion that supports the right rear wheel 42. The case structure 30 is connected to the left and right front frames 21 and functions as a cross beam of the vehicle body frame 2. The rear frame 22 extends from the case structure 30 and the front frames 21 and defines a mounting face 22S. On this mounting face 22S, there is disposed a battery box BB capable of mounting a plurality of battery packs 6.

In the instant embodiment, the electric motor 4 for driving the driving wheels is constituted of a left motor 4L for driving the left rear wheel 12 and a right motor 4R for driving the right rear wheel 12, and the center case portion 30C functions as a common housing for the left motor 4L for driving the left rear wheel 12 and the right motor 4R for driving the right rear wheel 12. A transmission 4T includes a left transmission mechanism 43 for transmitting power of the left motor 4L to the left rear wheel 41 and a right transmission mechanism 44 for transmitting power of the right motor 4R to the right rear wheel 42. The left transmission mechanism 43 is enclosed in the left case portion 30L, whereas the right transmission mechanism 44 is enclosed in the right case portion 30R. Although only schematically represented as boxes surrounded by dotted lines in FIG. 6, the left transmission mechanism 43 and the right transmission mechanism 44 are to be constituted of gear pairs or chains or transmission shafts, etc.

The left motor 4L and the right motor 4R are speed-variably controlled independently of each other. With this arrangement, when the left and rear wheels 12 are driven at a same speed or substantially same speeds in a forward direction, a straight forward traveling is provided. When the left and rear wheels 12 are driven at a same speed or substantially same speeds in a reverse direction, a straight reverse traveling is provided. Further, when the speeds of the left and right rear wheels 12 are made different from each other, a turning is provided in which the vehicle body frame 2 is steered in a desired direction. For instance, if one of the left and right rear wheels 12 is set to a low speed near a zero speed and the other is operated to the forward side or reverse side at a high speed, a small turn is provided. Moreover, when the left and right rear wheels 12 are driven in directions opposite to each other, a spin turn is provided in which the vehicle body frame 2 is turned about a substantially center between the left and right rear wheels 12. As the left and right front wheels 11 are constituted as caster wheels that allow free change of direction about a vertical axis, the direction will be corrected in accordance with the traveling direction by the driving of the left and right rear wheels 12.

Speed changing operations for the left motor 4L and the right motor 4R are effected by a pair of left and right speed changer levers 18 disposed on the opposed sides of the driver's seat 16a shown in FIG. 4 and FIG. 5. When the speed changer lever 18 is maintained at a front-rear neutral position, a stepless speed changer device is set to a neutral stopped state. When the speed changer lever18 is operated forwardly from the neutral position, a forward speed change is realized. When it is operated reversely, a reverse speed change is realized.

At a rear portion of the driving section 16, a ROPS device 17 is provided. This ROPS device 17 comprises a U-shaped arch member, with its left and right free regions being connected to the rear frame 22 and the left case portion 30L and the right case portion 30R.

As shown in FIG. 6, in a space surrounded by the center case portion 30C, the left case portion 30L and the right case portion 30R, a working motor 4W for providing power to a mower unit 13 as a utility implement W is disposed. This working motor 4W has its output shaft extending forwardly in the vehicle body front-rear direction and its power is transmitted via a relay shaft 130 to the blade transmission mechanism 131 of the mower unit 13.

Next, the battery box BB will be explained. The battery box BB includes a case 60 attached to the vehicle body frame, and an inside space of the case 60 is divided into a device accommodating chamber S2 having a circulator fan 69, etc. and a battery accommodating chamber Si having the plurality of battery mounting portions 7. The device accommodating chamber S2 is disposed upwardly of the battery accommodating chamber S1. The inside space of the case 60 is substantively closed and air circulation is provided by the circulator fan. In the instant embodiment, the battery mounting portions 7 are provided in five levels in the perpendicular direction (vertical direction), allowing mounting of five battery packs 6 having flat and rectangular shape. On one side of each level, there is fixed a receptacle 71 that is a vehicle-body side constituent of a connector 70 constituting the battery mounting portion 7. In one face of the battery pack 6, there is provided a plug 72 which is a battery-side constituent of the connector 70. In the other end face of the battery pack 6, a handle is provided. On the other side of each level, there is formed an insertion opening 62 that can be closed by a lid 61. Further, in each level, there is provided a slide rail as the slide mechanism 10. When the battery pack 6 is inserted into the insertion opening 62 and then slid to the deep side with using the slide rail, the receptacle 71 and the plug 72 become connected to each other. The receptacle 71 functions as a main body contact 7a, whereas the plug 72 acts as a battery contact 6a.

[Other Embodiments]

(1) In the foregoing embodiment, five battery mounting portions 7 are disposed along the vertical direction, so that five battery packs 6 at most can be accommodated in five levels. Instead, any other number and/or levels can be employed. Further, instead of accommodating the battery packs 6 altogether in the battery box BB, it is also possible to employ an arrangement of disposing the battery mounting portions 7 and the battery packs 6 in distribution at different places of the vehicle body.

(2) In the foregoing embodiment, in order to circulate air present inside the battery box BB, the circulator fan 69 is disposed. Instead, with omission of such circulator fan 69, it is possible to employ an arrangement of introducing ambient air with using a duct, a louver, or the like.

(3) In the foregoing embodiment, there was cited a grass mower machine as an example of electric work vehicle having the battery packs 6. The present invention is applicable also to an agricultural work machine such as a rice planter, a combine harvester, a tractor, or even to a civil engineering machine such as a backhoe, a bucket loader, etc.

The invention claimed is:

1. An electric work vehicle comprising:
    a plurality of battery mounting portions with each of the battery mounting portions comprising a main body contact such that the electric work vehicle comprises a plurality of main body contacts;
    a plurality of battery packs each comprising a battery contact and detachably mounted to the battery mounting portions such that each of the battery contacts is electrically connected to one of the plurality of main body contacts;
    a power feeding circuit to which each of the plurality of main body contacts is electrically connected in parallel;
    a battery switch associated with each of the plurality of battery packs such that the electrical work vehicle comprises a plurality of battery switches, each of the plurality of battery switches having a first position that blocks flow of electric power from one of the plurality of battery packs to the power feeding circuit;
    a switch operating portion for operating the plurality of battery switches;
    a charged amount estimating portion for estimating a charged power of each of the plurality of battery packs mounted to each of the plurality of battery mounting portions;
    an electric motor driven by power fed from at least one battery pack via the power feeding circuit; and
    a driving wheel receiving power transmitted from the electric motor.

2. The electric work vehicle according to claim 1, wherein the switch operating portion is configured to be capable of automatic operation for switching a battery pack having a charged capacity below the reference value to a battery pack having a charged capacity higher than the reference value.

3. The electric work vehicle according to claim 1, wherein there is provided a reporting device for reporting a battery pack whose charged capacity is below the reference value, and the switch operating portion is configured to be manually operable.

4. The electric work vehicle according to claim 1, wherein each of the plurality of battery switches is incorporated in the power feeding circuit.

5. The electric work vehicle according to claim 1, wherein each of the plurality of battery switches is incorporated in the battery pack.

6. The electric work vehicle according to claim 1, wherein each of the plurality of battery mounting portions includes a slide mechanism to which the battery pack is to be slidably inserted directly from the outside of the vehicle body.

* * * * *

UNITED STATES PATENT AND TRADEMARK OFFICE
CERTIFICATE OF CORRECTION

PATENT NO. : 10,038,176 B2
APPLICATION NO. : 15/356771
DATED : July 31, 2018
INVENTOR(S) : Hirokazu Ito et al.

It is certified that error appears in the above-identified patent and that said Letters Patent is hereby corrected as shown below:

On the Title Page

Column 2, under *cited by examiner Line 1, delete "Walter" and insert -- Walters --.

In the Specification

Column 1, Line 2, after "RELATED" delete "TO".

Signed and Sealed this
Thirteenth Day of November, 2018

Andrei Iancu
*Director of the United States Patent and Trademark Office*